(12) United States Patent
Keast et al.

(10) Patent No.: US 12,115,472 B2
(45) Date of Patent: Oct. 15, 2024

(54) BI-DIRECTIONAL SPRING FILTER

(71) Applicant: Larry G. Keast, Houston, TX (US)

(72) Inventors: Larry G. Keast, Houston, TX (US); Richard Arancelovic, Houston, TX (US)

(73) Assignee: Larry G. Keast, Houston, TX (US)

( * ) Notice: Subject to any disclaimer, the term of this patent is extended or adjusted under 35 U.S.C. 154(b) by 0 days.

(21) Appl. No.: 18/382,564

(22) Filed: Oct. 23, 2023

(65) Prior Publication Data

US 2024/0131454 A1 Apr. 25, 2024
US 2024/0226778 A9 Jul. 11, 2024

Related U.S. Application Data

(60) Provisional application No. 63/418,881, filed on Oct. 24, 2022.

(51) Int. Cl.
| | |
|---|---|
| *B01D 29/11* | (2006.01) |
| *B01D 29/66* | (2006.01) |
| *B01D 35/26* | (2006.01) |
| *E21B 3/02* | (2006.01) |
| *E21B 19/16* | (2006.01) |

(52) U.S. Cl.
CPC ............ *B01D 29/114* (2013.01); *B01D 29/66* (2013.01); *B01D 35/26* (2013.01); *E21B 3/022* (2020.05); *E21B 19/16* (2013.01)

(58) Field of Classification Search
CPC ...... B01D 29/114; B01D 29/66; B01D 35/26; E21B 3/022; E21B 19/16
See application file for complete search history.

(56) References Cited

U.S. PATENT DOCUMENTS

| | | |
|---|---|---|
| 1,741,705 A | 12/1929 | Liddell |
| 2,014,105 A | 9/1935 | Dooley |
| 4,292,180 A | 9/1981 | Zylka et al. |
| 5,407,570 A | 4/1995 | Hobson, Jr. |
| 6,325,932 B1 * | 12/2001 | Gibson ................. B01D 37/00 417/313 |
| 8,029,680 B2 | 10/2011 | Shinoda et al. |
| 2012/0211410 A1 * | 8/2012 | Wnuk .................... B01D 29/58 210/457 |
| 2016/0030864 A1 * | 2/2016 | Anderson ............. B01D 29/66 210/323.1 |
| 2018/0050926 A1 * | 2/2018 | Ruprecht ............... B01D 29/58 |
| 2020/0141200 A1 * | 5/2020 | Biggerstaff .......... E21B 21/065 |
| 2021/0402342 A1 * | 12/2021 | Miller .................. B01D 29/114 |

FOREIGN PATENT DOCUMENTS

WO     WO-9618022 A1 *  6/1996  ........... B01D 29/111

* cited by examiner

*Primary Examiner* — James G Sayre
(74) *Attorney, Agent, or Firm* — Kearney, McWilliams & Davis, PLLC; John M. DeBoer (57) ABSTRACT

A filter assembly that includes a main body having a bore therein forming an inner surface, the inner surface configured with a receptacle. There is a filter medium disposed at least partially in the receptacle, the filter medium having a plurality of winding. An at least one of the plurality of windings separated by a clearance to an adjacent winding.

17 Claims, 6 Drawing Sheets

BI-DIRECTIONAL SPRING FILTER

BACKGROUND

Field of the Disclosure

This disclosure generally relates to machines, tools, systems, and the like used in the oil and gas industry, such as a power swivel. More specifically, the disclosure relates to a filter assembly for use in applications that may utilize bi-directional flow. The filter assembly can be a quick connect assembly.

Background of the Disclosure

When drilling for oil or gas, a wellbore is typically drilled using a drill bit attached to the lower end of a "drill string." The process of drilling a well typically includes a series of drilling, tripping, casing and cementing, and repeating as necessary. Normally, relatively large drilling rigs are used for these wells, which utilize a 'kelly' table and associated equipment.

Figure 1A:
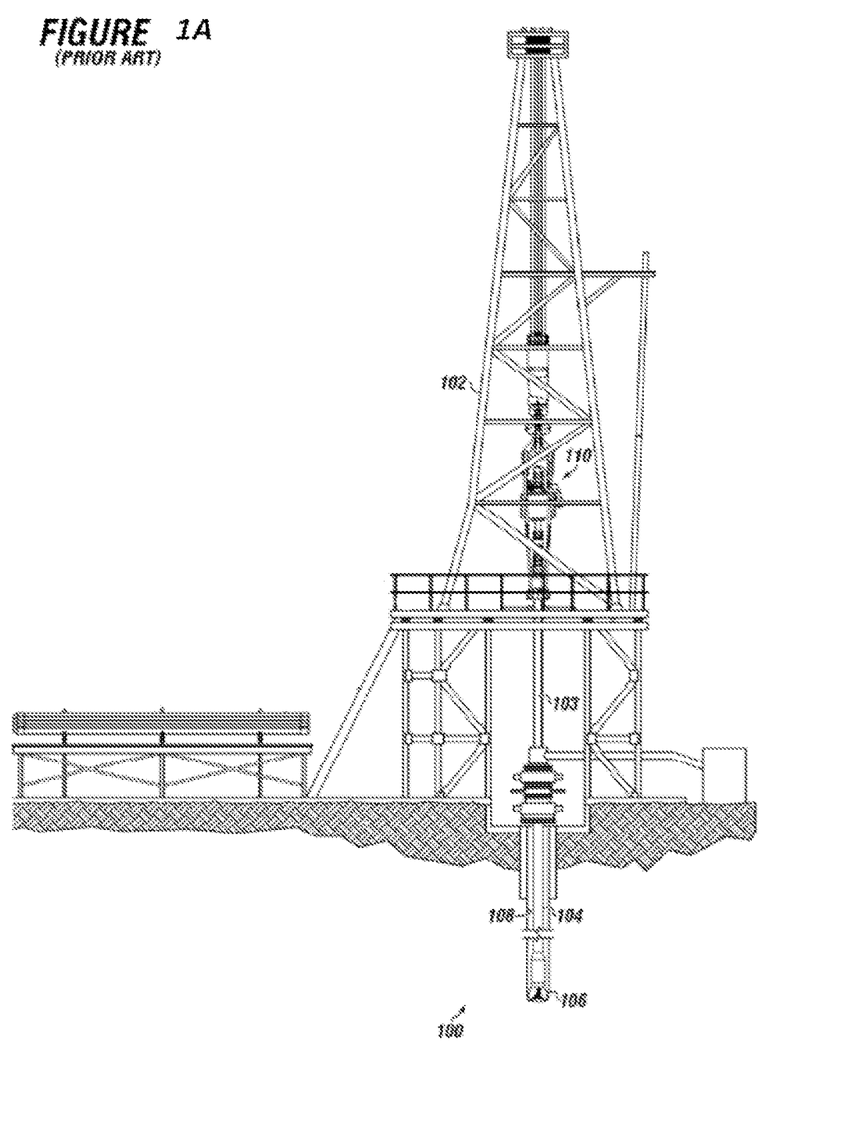
FIG. 1A is a side view of a process diagram of a conventional derrick operation for an oil and gas production system.

FIG. 1A shows a simplified view of a conventional drilling operation 100 using a powerful driver. A derrick 102 (or drilling rig) is configured to rotate a drill string 104 that has a drill bit 106 disposed at a lower end of the drill string 104, typically using a driver unit 110 and associated equipment. The driver unit 110 rotates the string 104 and the drill bit 106 to do drilling or milling work downhole in the wellbore 108

The derrick structures of these large drilling rigs require high capital and operating cost, including significant transport logistics. The rigs may be assembled on site and must be capable of withstanding rotary torques and other loads. As a result of size and strength, the derrick structure of these assembled drilling rigs need not require guy wire torsional or other support of these derrick structures.

Figure 1B:
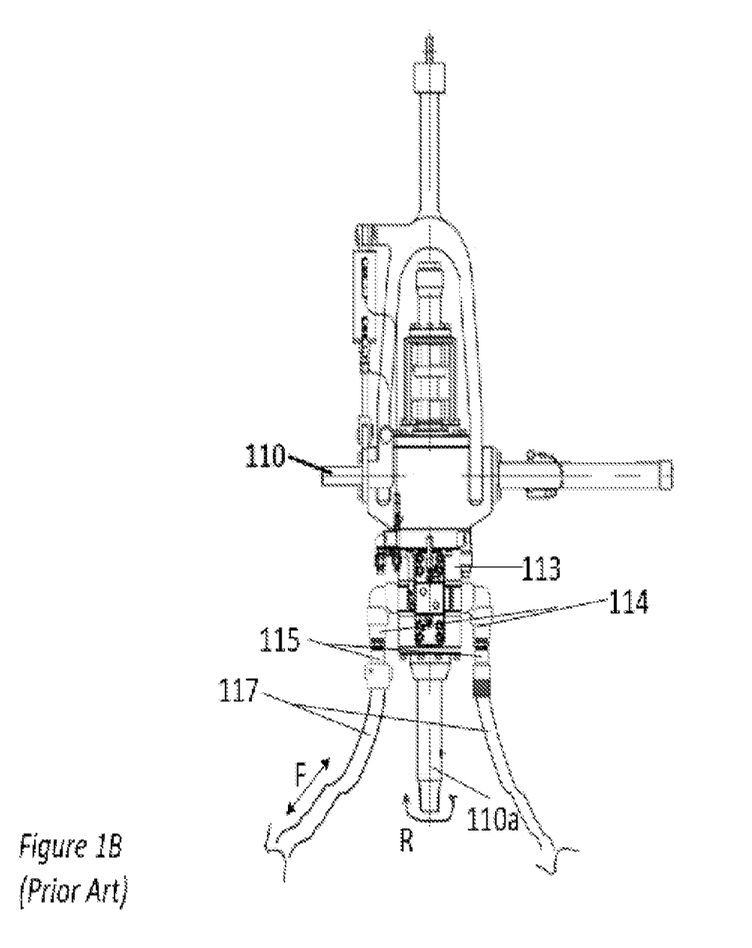
FIG. 1B is a side view of a process diagram of a power swivel.

For operations of less demand, and that do not require larger torques, a reduced-size (or portable) workover rig may be used. Rotation is typically accomplished using a driver, namely, a power swivel 110, thus eliminating the need for the kelly and associated equipment. In this manner, the power swivel 110 can apply torque to a tubular 103 while moving up or down the rig 102.

The power swivel 110 may include a motor 113, which may be a hydraulic motor powered by a utility fluid F (such as hydraulic fluid or other comparable motor oil). As the motor 113 is powered and rotated, a stem 110a of the power swivel 110 correspondingly rotates. The fluid F is fed to the motor 113 (usually via a pump discharge) via cables or hoses 117.

Since the stem 110a needs to rotate in either direction R, the flow of the fluid F needs to be bi-directional (see arrows). The hoses 117 are coupled with driver fittings 114 via couplers 115, which in some instances is of the quick-connect type. The location of the connection on the swivel 110 accommodates easy connect and disconnect of the hoses 117 so that the swivel 110 can be coupled with the derrick 102 or whatever rig structure is used.

Unfortunately, when disconnected, debris, dirt, or other contaminants can inadvertently end up trapped in the hoses 117, and upon (re)connection to the swivel 110, can enter the motor 113 and cause significant damage. In the hydraulic circuit associated with the motor 113 and feed pumps, a filter might be used to capture debris, but these filters are usually on the suction of the pump. When the pump is reversed, any debris held by the filter flows out of it and back toward the motor.

The archaic filtration industry business model is based on replacement sales of expensive filter elements, and is not in line with modern environmental, social, and governance ("ESG"), as current economic, public health and other societal crises have intensified focus. Regular filters require disposal of dirty elements with most liquid media. Filter elements are sometimes not replaced in a timely manner due to the expense. Typical pleated filter elements require flow only from outside to inside to maximize filtration area. Conventional media filters are also inadequate on the discharge side of a pump, that may have high pressures.

A need exits for a filter assembly that addresses these deficiencies and concerns. There is a need in the art for filter assembly useful for protecting one or more components of a power swivel that may save time, money, and increase safety. There is a need for rapid attachment and detachment. The ability to increase efficiency and save operational time and expense while increasing safety leads to considerable competition in the marketplace. Achieving any ability to save time, or ultimately cost, while increasing safety leads to an immediate competitive advantage.

SUMMARY

Embodiments of the present disclosure pertain to a filter assembly useful for operation of a driver, such as a power swivel. The filter assembly may be configured for rapid or quick attachment/detachment.

Embodiments of the disclosure pertain to a filter assembly that may include any of the following: a main body (which may have a bore therein forming an inner surface; the inner surface configured with a receptacle); a filter medium; and/or a head adapter.

The head adapter may be coupled with the main body. The head adapter may be configured with a plug engaged with a filter medium.

The filter medium may be disposed at least partially in the receptacle. The filter medium may have one or more windings. An at least one of a plurality of windings may be separated by a clearance to an adjacent winding.

The filter medium may include an elongated body and configured with a filter medium bore. In aspects, the plug may engage into the filter medium bore.

The filter medium may have a compressed position and a decompressed position. In the compressed position the clearance may have a clearance gap range between at least 5,000 microinches to no more than 20,000 microinches.

The head adapter may be configured with an at least one flow path. The filter assembly may be coupled in fluid communication between one or more components, such as a pump and a power swivel. An annulus may be formed between the inner surface and the filter medium.

The presence of any clearance may facilitate fluid flow in a first direction through the filter medium, and also in a second, opposite direction through the filter medium.

Other embodiments of the disclosure may pertain to a fluid filtration system that may include one or more of: a pump, a motor, and/or a filter assembly.

In aspects, the filter assembly may be coupled in fluid communication between the pump and the motor. The filter assembly may include a main body, a head adapter, and a filter medium.

The main body may have a bore therein forming an inner surface, the inner surface configured with a receptacle. The filter medium may be disposed, at least partially, in the receptacle. The filter medium may have a plurality of windings. An at least one of the plurality of windings may be separated by a clearance to an adjacent winding. There may be a head adapter coupled with the main body. The head adapter may be configured with a plug engaged with the filter medium.

The pump may be a reversible pump. In aspects, there may be a second filter assembly also coupled in fluid communication between the pump and the motor. The motor may be operably associated with a power swivel.

The filter assembly may be configured to retain a debris therein when fluid flows in a first direction therethrough, and/or may be able to release the debris when fluid flows in a second direction therethrough These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Regardless of whether presently claimed herein or in another application related to or from this application, herein disclosed are novel apparatuses, units, systems, and methods that pertain to improved handling of tubulars, details of which are described herein. Such novel apparatuses may also have uses in applications unrelated to improved handling of tubulars, such as a latching assembly for engaging a pipe and allowing lateral movement. Additionally, slide components may be used instead of rollers.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, piping, and so forth. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

Terms

The term "connected" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth. Any use of any form of the terms "connect", "engage", "couple", "attach", "mount", etc. or any other term describing an interaction between elements is not meant to limit the interaction to direct interaction between the elements and may also include indirect interaction between the elements described.

The term "fluid" as used herein may refer to a liquid, gas, slurry, single phase, multi-phase, pure, impure, etc. and is not limited to any particular type of fluid such as hydrocarbons.

The term "fluid connection", "fluid communication," "fluidly communicable," and the like, as used herein may refer to two or more components, systems, etc. being coupled whereby fluid from one may flow or otherwise be transferrable to the other. The coupling may be direct, indirect, selective, alternative, and so forth. For example, valves, flow meters, pumps, mixing tanks, holding tanks, tubulars, separation systems, and the like may be disposed between two or more components that are in fluid communication.

The term "pipe", "conduit", "line", "tubular", or the like as used herein may refer to any fluid transmission means, and may (but need not) be tubular in nature.

The term "composition" or "composition of matter" as used herein may refer to one or more ingredients, components, constituents, etc. that make up a material (or material of construction). Composition may refer to a flow stream of one or more chemical components.

The term "skid" as used herein may refer to one or more pieces of equipment operable together for a particular purpose. For example, a 'catwalk-power swivel skid' may refer to one or more pieces of equipment operable together to provide or facilitate presenting a tubular to a derrick. A skid may be mobile, portable, or fixed. Although 'skid' may refer to a modular arrangement of equipment, as used herein may be mentioned merely for a matter of brevity and simple reference, with no limitation meant. Thus, skid may be comparable or analogous to zone, system, subsystem, and so forth.

The term "skid mounted" as used herein may refer to one or more pieces operable together for a particular purpose that may be associated with a frame- or skid-type structure. Such a structure may be portable or fixed.

The term "engine" as used herein may refer to a machine with moving parts that converts power into motion, such as rotary motion. The engine may be powered by a source, such as internal combustion.

The term "motor" as used herein may be analogous to engine. The motor may be powered by a source, such as electricity, pneumatic, or hydraulic.

The term "pump" as used herein may refer to a mechanical device suitable to use an action such as suction or pressure to raise or move liquids, compress gases, and so forth. 'Pump' can further refer to or include all necessary subcomponents operable together, such as impeller (or vanes, etc.), housing, drive shaft, bearings, etc. Although not always the case, 'pump' may further include reference to a driver, such as an engine and drive shaft. Types of pumps include gas powered, hydraulic, pneumatic, and electrical.

The term "utility fluid" as used herein may refer to a fluid used in connection with the operation of a heat generating device, such as a lubricant or water. The utility fluid may be for heating, cooling, lubricating, or other type of utility. 'Utility fluid' may also be referred to and interchangeable with 'service fluid' or comparable.

The term "mounted" as used herein may refer to a connection between a respective component (or subcomponent) and another component (or another subcomponent), which may be fixed, movable, direct, indirect, and analogous to engaged, coupled, disposed, etc., and may be by screw, nut/bolt, weld, and so forth.

The term "power swivel" as used herein may refer to a type of equipment used on a service rig or drilling rig, mainly to facilitate rotational operations. A power swivel may be powered, such as hydraulically or electrically, for handling or rotating tubulars, and may also act as a channel for drilling fluid. It also supports the weight of the drill string of pipe safely over men's heads. as used herein may refer to any driver machine or device suitable and known to one of ordinary skill in the art to impart work, typically in the form of suspending and rotating pipe. A power swivel or a top drive is an example of such a driver. A power swivel known to one of skill as being an alternative to and different from a rotary table.

Figure 2A:
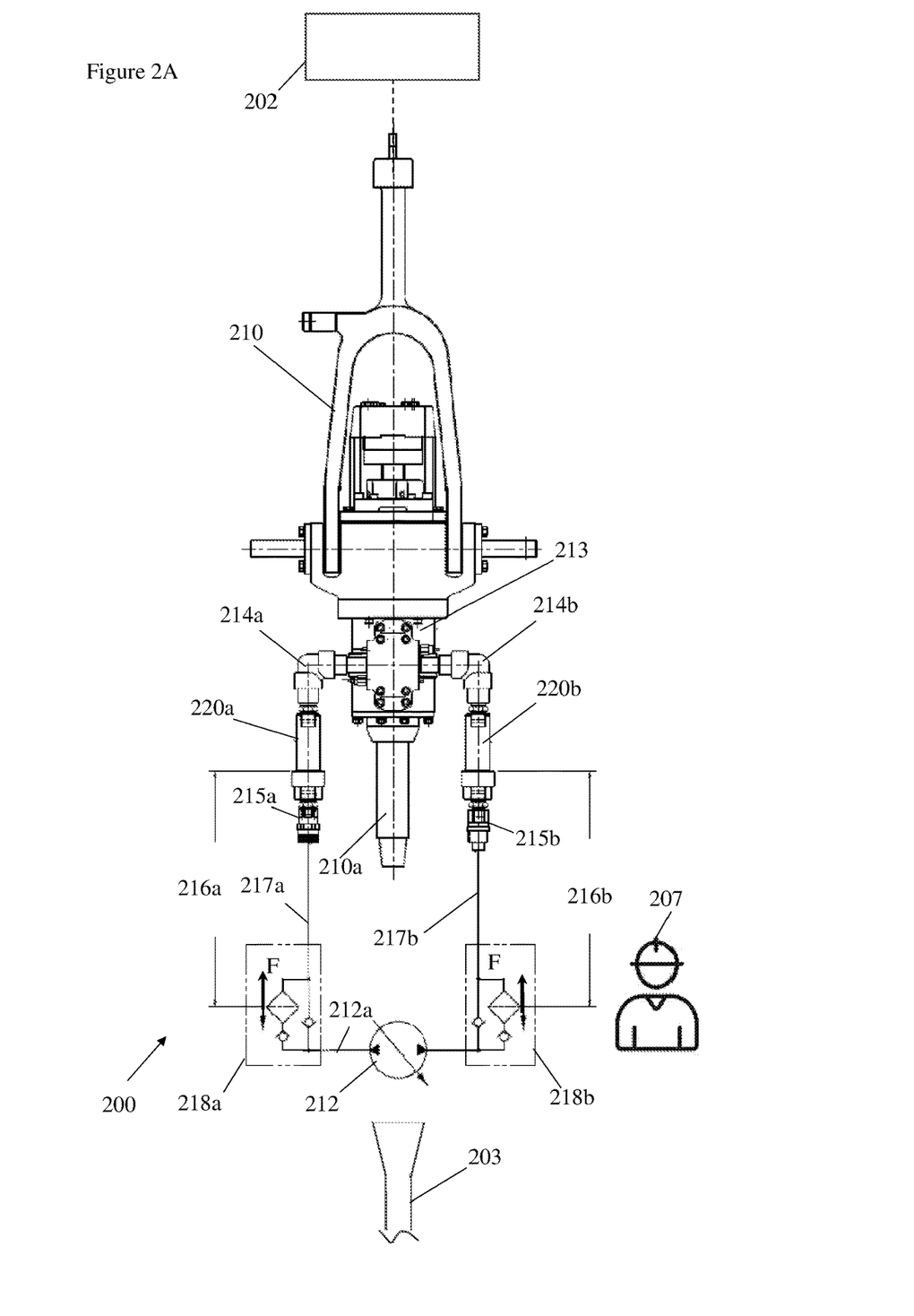
FIG. 2A shows a hybrid component process flow diagram of a flow system having a filter assembly according to embodiments of the disclosure.
Figure 2B:
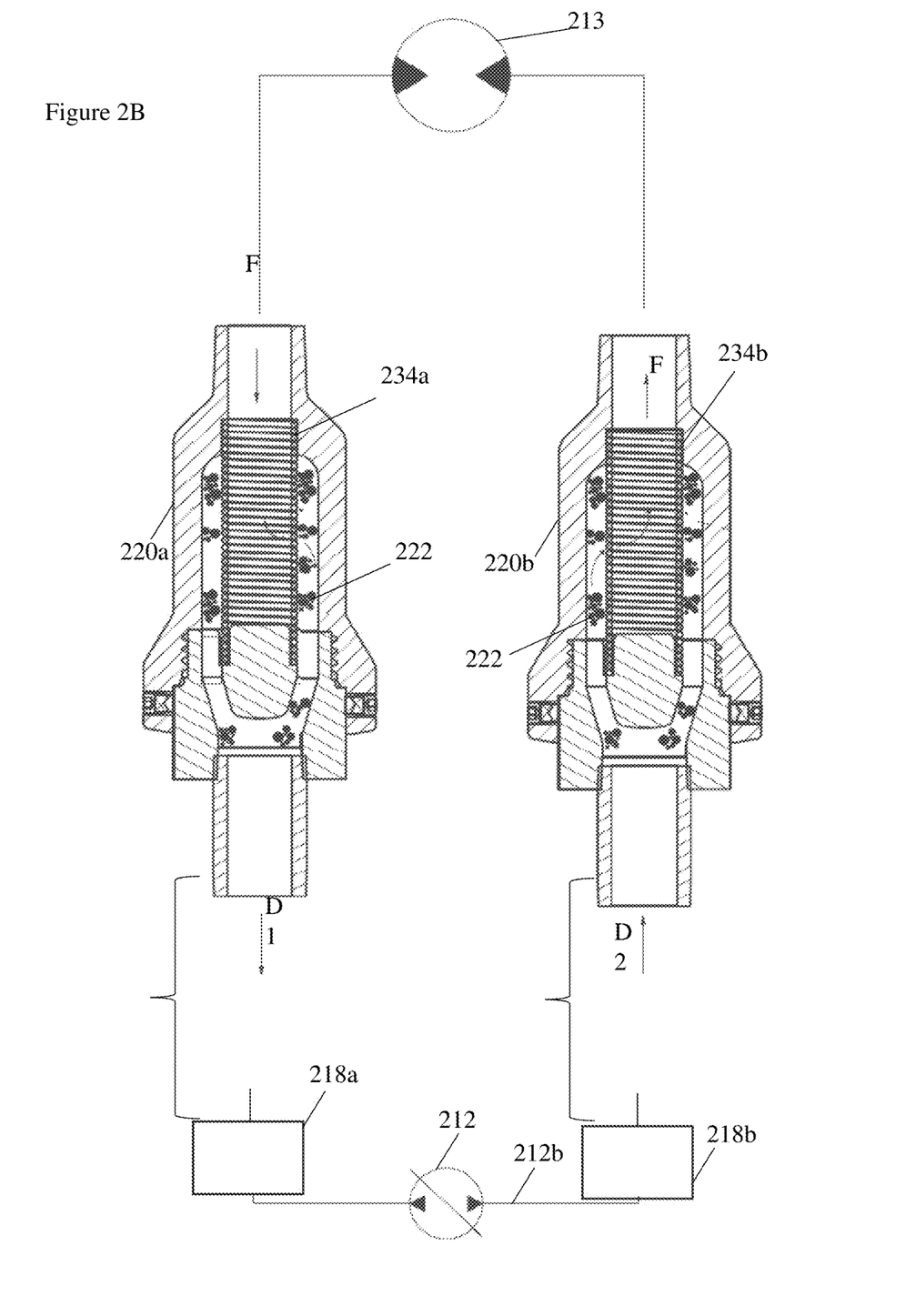
FIG. 2B shows a schematic process flow view of a fluid filtration system according to embodiments of the disclosure.

Referring now to FIGS. 2A and 2B, a hybrid component process flow diagram of a flow system having a filter assembly and a schematic process flow view of a fluid filtration system, illustrative of embodiments disclosed herein, are shown. FIGS. 2A and 2B show a comparable pressurized flow operation or system 200. Although shown here with a driver (power swivel) 210 operably coupled with a rig or comparable derrick structure 202 (shown here only in simple block form), the system 200 is not otherwise limited to any size or configuration. Embodiments here may be useful to any particular operation where filtered flow may be desired, especially in the event of a (reversible) pump 212 in fluid communication with a (hydraulic) motor 213.

Some reference to 'drilling' may occur, but the working operation or system 200 is not meant to be limited, as there are a number of instances and operations applicable to embodiments herein. For example, FIG. 2A shows a power swivel 210, whereas FIG. 2B shows a more general fluid filtration system for a pump-motor fluid flow network (or loop). The Figures may be referred to separately or together for convenience due to general similarity. The system 200 may be operated or otherwise used in a manner to provide, control, facilitate, etc. flow of fluid F. While it need not be exactly the same, the system 200 may be assembled, run, and operated as described herein and in other embodiments, and as otherwise understood to one of skill in the art. Similarities may not be discussed for the sake of brevity.

Components of the system 200 may be arranged by, disposed on, or otherwise coupled with the rig 202, and as otherwise understood to one of skill in the art. Associated or auxiliary equipment including automation, controllers, piping, hosing, valves, wiring, nozzles, pumps, gearing, tanks, etc. may be shown only in part, or may not be shown or described, as one of skill in the art would have an understanding of coupling the components of the system 200 for operation thereof. For example, the pump (with engine) 212 may be in fluid communication with the motor 213 of the power swivel 210 (such as via a manifold, piping, tubing, etc.). All components of the system 200 requiring power or automation may be provided with wiring, tubing, piping, etc. in order to be operable therefore.

The system 200 may include the rig 202 configured with suitable components to rotate a drill string. The drill string may be rotated with the power swivel 210 (with associated elevator, drive frame, drawworks, etc.). Associated or auxiliary components may include a hose reel, a hydraulic fluid tank, a pump and engine, and the like. In embodiments, rig personnel or an operator 207 may control the power swivel 210 and overall operation of the system 200. One of skill would appreciate that all operations associated with operating the system, as well as operation of the power swivel 210 (including while on the rig 202), may be accomplished by personnel 207.

The power swivel 210 may have a stem 210a for engaging or disengaging (e.g., threadably) with a tubular 203. The motor 213 may be operable for rotating the coupled tubular, such as in a first direction or a second (opposite) direction. As shown here, the motor 213 may be hydraulically powered by pumped (pressurized) hydraulic fluid F. The hydraulic fluid F may be circulated in a loop, such that in the first direction through the system 200, the motor 213 rotates a first direction. Then, in the event the pump 212 is reversible, the fluid F may be circulated in the loop in the second or opposite direction.

The pump 212 may have a first end 212a operable as either a suction or discharge, depending on motor operation. The first end 212a may be in fluid communication with the motor 213 via interim components, such as a first pump filter 218a. The first pump filter 218a may be coupled with a first filter assembly 220a via hosing, piping, cabling, etc. 217a.

The pump filter 218a may include a bypass flow via one or more check valves, along with a (one-way) flow filter. The coupling may occur via a first coupler 215a, which may be of a quick connect/disconnect type. To complete the flow path, the filter assembly 220a may be coupled with a fluid fitting (which may be an elbow-type coupler) 214a, that in turn couples with the power swivel 210.

The pump 212 may have a second end 212b operable as either a suction or discharge, depending on motor operation. The second end 212b may be in fluid communication with the motor 213 via interim components, such as a second pump filter 218b. The second pump filter 218b may include a bypass flow via one or more check valves, along with a (one-way) flow filter. The second pump filter 218b may be coupled with a second assembly 220b via hosing, piping, cabling, etc. 217b. The coupling may occur via a second coupler 215b, which may be of a quick connect/disconnect type. To complete the flow path, the second filter assembly 220b may be coupled with a second fluid fitting (which may be an elbow-type coupler) 214b, that in turn couples with the power swivel 210.

For the times when the first coupler 215a and/or the second coupler 215b are disconnected, debris (rocks, pebbles, dirt, etc.) may inadvertently enter either or both of the hoses 217a, 217b or respective filter assemblies 220a, 220b.

However, the debris may now be maintained in the respective filtered flow regimes 216a, 216b. That is, for example, for any debris present in regime 216a, this debris may be flown into the filter assembly 220a, but due to the nature of the assembly 220a, the debris may not pass behind or through the assembly 220a into the motor 213.

In the event flow is reversed, the debris may be pushed or released out of the assembly 220a down into the first pump filter 218a; however, due to the nature of the pump filter 218a, the debris may not pass behind the filter 218a into the suction of the pump 212a. One of skill would appreciate the similar nature associated with the regime 216b and respective components.

FIG. 2B in particular shows operation of the system 200 in a manner whereby fluid F flows in a first direction DI (from the motor 213 toward the pump 212) with debris 222 flowable out of the first filter assembly 220a (and away from first filter medium 234a) into the first flow regime 216a. At the same time, fluid F flows in a second direction DI (from the pump 212 toward the motor 213), whereby any debris 222 in the flow regime 216b may now be captured or retained by the second filter assembly 220b (and against second filter medium 234b).

Figures 3A, 3B:
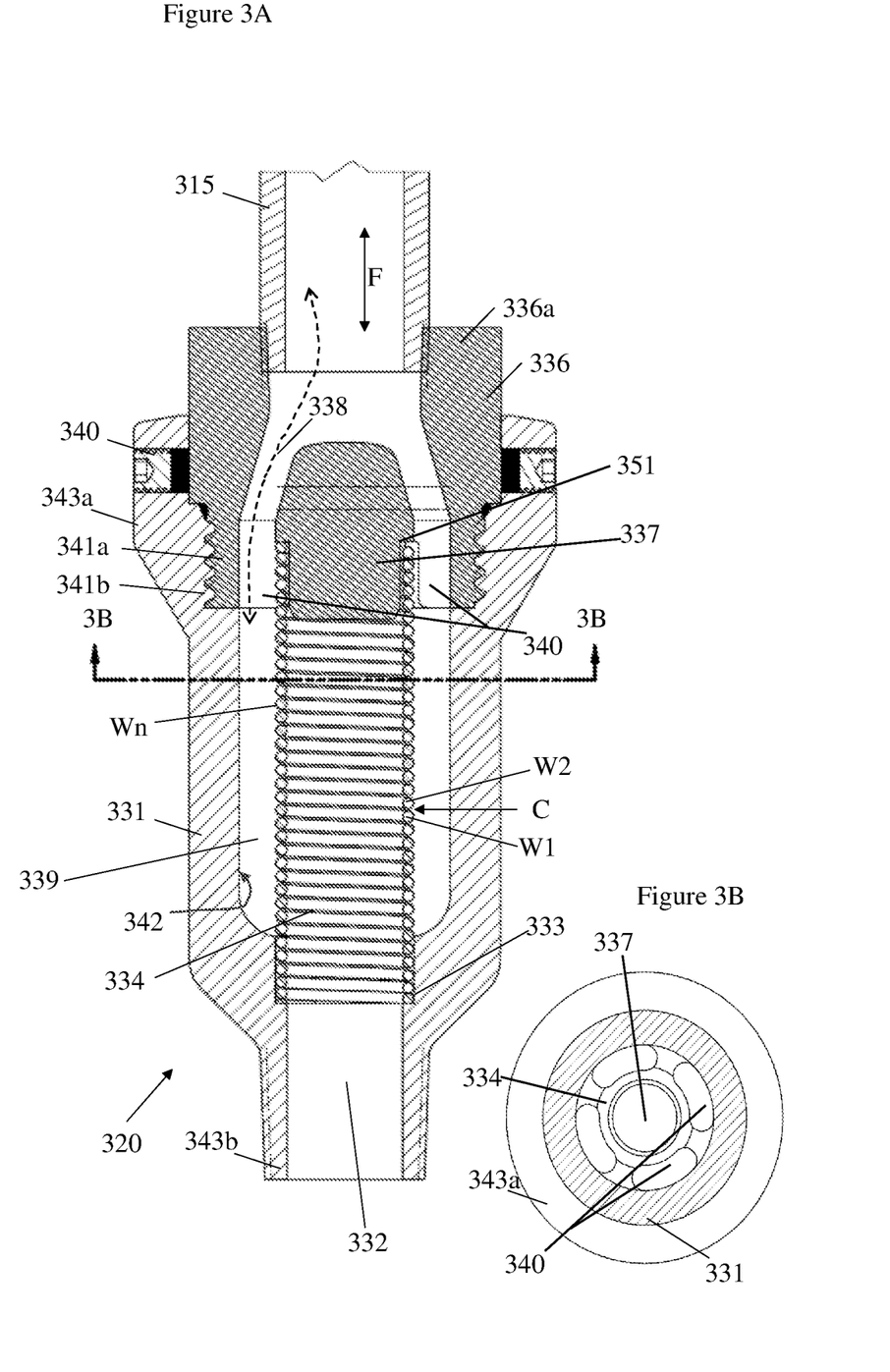
FIG. 3A shows a longitudinal side cross-sectional view of a filter assembly according to embodiments of the disclosure.
FIG. 3B shows a lateral cross-sectional view of the latch assembly of FIG. 3A according to embodiments of the disclosure.

Referring now to FIGS. 3A and 3B, a longitudinal side cross-sectional view and a lateral cross-sectional view, respectively, of a filter assembly, illustrative of embodiments disclosed herein, are shown.

FIGS. 3A and 3B together show a filter (or filtration) assembly 320 that may be used with a fluid network of any type, such as those of embodiments disclosed herein, are shown. The assembly 320 may like that of other assemblies described (e.g., 220a, 220b, etc.), and similarities may not be discussed in detail. Just the same, there may be differences, including as described, if any. The filter assembly 320 may be coupled with another piece of equipment, such as a power swivel (210) of the like.

The filter assembly 320 may have a main body 331 having a first body end 343a and second body end 343b. The main body 331 may have a bore 332 extending at least partially or entirely therethrough from the first end 343a to the second end 343b. The presence of the bore 332 may coincide with an inner body surface 342, which may be continuous or discontinuous with one more bore IDs. As shown here, the inner body surface 342 may have a shoulder or receptacle 333 formed therein, which may be configured for a filter medium 334 to rest or reside therein and against.

The filter medium 334 may be an elongated member of any particular shape. As shown here, the filter medium 334 may be formed a plurality of coils or windings Wn. The number of windings Wn is not limited, and may be, for example, in a winding rang of about 5 to about 100. Any of the plurality of windings Wn may have one or a first winding W1 adjacent another or a second winding W2 separated by a clearance C. In aspects, most or all of the windings Wn may be separated from an adjacent winding by the clearance C. The clearance C may have a first or decompressed position when the filter medium 334 is removed or not installed in the assembly 320.

As shown here, the clearance C may have a second or compressed position, which may have a clearance gap range of about 5,000 microinches to about 20,000 microinches. The clearance C is not meant to be limited, and may be as desired. The clearance between any two windings may not be exactly the same. The clearance C may be adjustable based on how tight a head adapter 336 may be coupled with the main body 331. The head adapter 336 may have a mating feature (such as threads) 341a configured for coupling with a respective mating feature 341b of the main body 331. In some instances, the head adapter 336 and the main body 331 may be integral to each other. The adapter 336, body 331, and the medium 334 may be the (main or primary) components of the assembly 320.

The head adapter 336 may be configured to provide a flow path 338 for a fluid F to flow therethrough. The flow path 338 may occur via the presence of one or more ports 344 formed in the head adapter. The head adapter 336 may have a plug or head 337, which may be configured to engage the filter medium 334. As shown here, the plug 337 may have a plug shoulder or receptacle 351 for the filter medium 334 to engage with.

As desired, the head adapter 336 may be engaged in manner with the main body 331, whereby the filter medium 334 may be readily maintained therein. For example, in the event of threaded engagement, as the features 341a, 341b couple together, the windings Wn of the filter medium 334 may compress together until the desired clearance C. The filter medium 334 may be readily held and maintained within receptacles 333, 351. Although shown as threaded, other engagements are possible, including tolerance fit or the like. Moreover, although shown as female/male, the reverse is possible. The ensure reliable engagement, one or more securing members 340 may be used to couple the adapter 336 with the main body 331.

The filter medium 334 may be positioned in a manner whereby an annulus 339 forms between the inner surface 342 and the medium 334. The annulus 339 may provide sufficient clearance to capture debris and also accommodate flow of the fluid F (without detrimental pressure drop).

The ends 336a, 343b may be coupled with other components to provide fluid communication with the assembly 320. For example, as shown here a coupling 315 may be engaged with the end 343b. The end 343b may be coupled with a fitting (such as of a motor for a power swivel—see FIG. 2A). The fluid communication may be bi-directional, which is normally a detriment in filtration, but readily accommodated by embodiments herein.

Figures 4A, 4B, 4C:
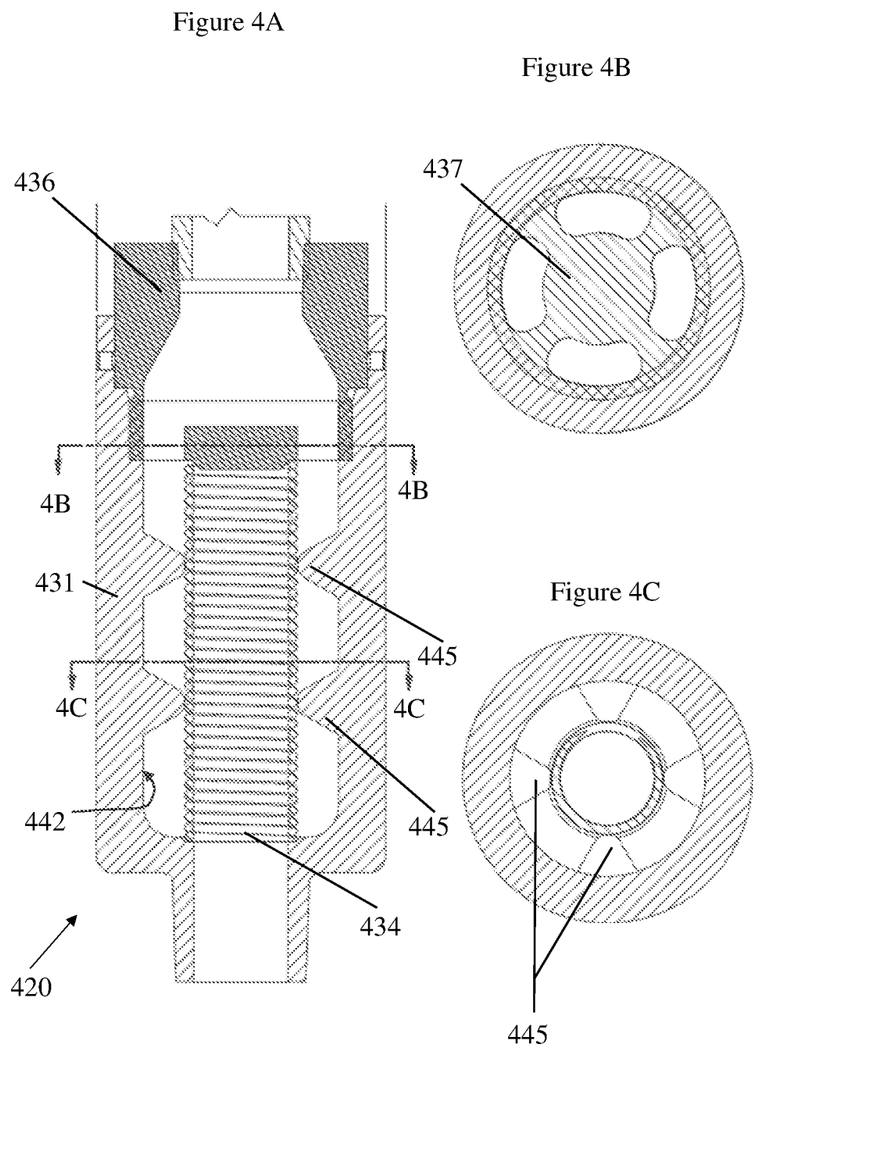
FIG. 4A shows a longitudinal side cross-sectional view of a filter assembly according to embodiments of the disclosure.
FIG. 4B shows a first lateral cross-sectional view of the filter assembly of FIG. 4A according to embodiments of the disclosure.
FIG. 4C shows a second lateral cross-sectional view of the filter assembly of FIG. 4A according to embodiments of the disclosure.

Referring now to FIGS. 4A, 4B and 4C together, a longitudinal side cross-sectional view, a first lateral cross-sectional view, and a second lateral cross-sectional view of a filter assembly, respectively, illustrative of embodiments disclosed herein, are shown.

FIGS. 4A-4C together show a filter (or filtration) assembly 420 that may be used with a fluid network of any type, such as those of embodiments disclosed herein, are shown. The assembly 420 may like that of other assemblies described (e.g., 320, etc.), and similarities may not be discussed in detail. Just the same, there may be differences, including as described, if any. The filter assembly 420 may be coupled with another piece of equipment, such as a power swivel (210) of the like.

The filter assembly 420 may have a main body 431 with an inner body surface 342, which may be continuous or discontinuous with one more bore IDs. Within the main body 431 may be a filter medium 434. The main body 431 may be engaged with a head adapter 436. The head adapter 436 may have a plug or head 437, which may be configured to engage the filter medium 434.

There may be times where fluid flow and pressure are significant through the assembly, whereby the inner surface 432 may have one or more ribs or protrusions 445 that may extend (e.g., radially or inward) into contact with the medium 434. The ribs 445 may prevent or mitigate buckling or uneven extrusion of the medium 434.

Advantages

Embodiments of the present disclosure may provide for a filter assembly that is easily cleanable. The flow direction through the assembly may be in either direction. Bidirectional usage may be advantage by using two filters to protect one hydraulic motor or pump. The filter assembly may be configured for corrosion resistance, strength, weight, etc. Particle exclusion size may be set by compression to a desired distance between coils or windings. Adjustable dimension between coils means the filter assembly may be used to adjust flow. Allowing adjustable dimension between coils to fully close coils means this device can act as adjustable flow control valve with on-off function. The assembly may be multifunctional, such as to combine functions of filtration and actuation. Any number of filter shapes may be used.

Embodiments herein may be retrofitted to existing field equipment. Companies who have purchased a power swivel may retrofit embodiments of the disclosure described herein to put on their assembly. Speed: time needed to install may be reduced. Even a small savings in drilling or servicing time of individual wells results in an enormous savings on an annual basis.

While preferred embodiments of the disclosure have been shown and described, modifications thereof may be made by one skilled in the art without departing from the spirit and teachings of the disclosure. The embodiments described herein are exemplary only and are not intended to be limiting. Many variations and modifications of the embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A filter assembly comprising:
   a main body having a bore therein forming an inner surface, the inner surface configured with a receptacle;
   a filter medium disposed at least partially in the receptacle, the filter medium comprising a plurality of windings, an at least one of the plurality of windings separated by a clearance to an adjacent winding; and
   a head adapter coupled with the main body, the head adapter configured with a plug engaged with the filter medium,
   wherein the filter assembly is coupled in fluid communication between a pump and a power swivel.

2. The filter assembly of claim 1, wherein the filter medium comprises an elongated body and configured with a filter medium bore.

3. The filter assembly of claim 2, wherein the plug engages into the filter medium bore.

4. The filter assembly of claim 1, wherein the filter medium has a compressed position and a decompressed position, and in the compressed position the clearance has a clearance gap range between at least 5,000 microinches to no more than 20,000 microinches.

5. The filter assembly of claim 1, wherein the head adapter is configured with an at least one flow path.

6. The filter assembly of claim 1, wherein an annulus is formed between the inner surface and the filter medium.

7. The filter assembly of claim 1, wherein the clearance facilitates fluid flow in a first direction through the filter medium, and also in a second, opposite direction through the filter medium.

8. A filter assembly comprising:
 a main body having a bore therein forming an inner surface, the inner surface configured with a receptacle;
 a filter medium disposed at least partially in the receptacle, the filter medium comprising a plurality of windings, an at least one of the plurality of windings separated by a clearance to an adjacent winding; and
 a head adapter coupled with the main body, the head adapter configured with a plug engaged with the filter medium,
 wherein the filter medium has a compressed position and a decompressed position, and in the compressed position the clearance has a clearance gap range between at least 5,000 microinches to no more than 20,000 microinches, and
 wherein an annulus is formed between the inner surface and the filter medium,
 wherein the filter assembly is coupled in fluid communication between a pump and a power swivel.

9. The filter assembly of claim 8, wherein the filter medium comprises an elongated body and configured with a filter medium bore.

10. The filter assembly of claim 9, wherein the plug engages into the filter medium bore.

11. The filter assembly of claim 9, wherein the head adapter is configured with an at least one flow path.

12. The filter assembly of claim 9, wherein the clearance facilitates fluid flow in a first direction through the filter medium, and also in a second, opposite direction through the filter medium.

13. A fluid filtration system comprising:
 a pump;
 a motor; and
 a filter assembly coupled in fluid communication between the pump and the motor, the filter assembly further comprising:
  a main body having a bore therein forming an inner surface, the inner surface configured with a receptacle;
  a filter medium disposed at least partially in the receptacle, the filter medium comprising a plurality of windings, an at least one of the plurality of windings separated by a clearance to an adjacent winding; and
  a head adapter coupled with the main body, the head adapter configured with a plug engaged with the filter medium.

14. The fluid filtration system of claim 13, wherein the pump is a reversible pump.

15. The fluid filtration system of claim 14, wherein the filter assembly is able to retain a debris therein when fluid flows in a first direction therethrough, and is able to release the debris when fluid flows in a second direction therethrough.

16. The fluid filtration system of claim 13, the system further comprising a second filter assembly also coupled in fluid communication between the pump and the motor.

17. The fluid filtration system of claim 13, wherein the motor is operably associated with a power swivel.

* * * * *